United States Patent [19]

Fritsch

[11] Patent Number: 4,941,065
[45] Date of Patent: * Jul. 10, 1990

[54] APPARATUS FOR CLEANING A VIDEO PLAYER/RECORDER

[75] Inventor: Joseph F. Fritsch, Dublin, Ireland

[73] Assignee: Ryan Plastics Ireland Limited, Waterford, Ireland

[*] Notice: The portion of the term of this patent subsequent to May 10, 2005 has been disclaimed.

[21] Appl. No.: 709,049

[22] Filed: Mar. 7, 1985

[30] Foreign Application Priority Data

Mar. 9, 1984 [IE] Ireland .................................. 599/84

[51] Int. Cl.⁵ .............................................. G11B 5/41
[52] U.S. Cl. ............................ 360/128; 15/DIG. 13; 360/137
[58] Field of Search .............................. 360/128, 137; 15/DIGS. 12–13

[56] References Cited

FOREIGN PATENT DOCUMENTS

54-135523 10/1979 Japan .................................... 360/128

Primary Examiner—A. J. Heinz
Attorney, Agent, or Firm—Hughes & Multer

[57] ABSTRACT

A cassette cleaner for a video player/recorder, comprising a cassette housing having a cleaning device for a capstan and pinch roller. There are separate cleaning pads for the capstan and pinch roller, mounted on resilient arms, and a cleaning ribbon extends between the two cleaning pads in a manner to be able to be engaged by the capstan and pinch roller. A shut off mechanism is provided so as to be operated by the player/recorder so as to shut off the player/recorder after a predetermined number of revolutions of a drive spindle of the player/recorder.

23 Claims, 6 Drawing Sheets

APPARATUS FOR CLEANING A VIDEO PLAYER/RECORDER

This invention relates to improvements in cleaning apparatus for cleaning the operating components of a video player/recorder. In particular, the invention relates to improvements in cleaning apparatus for cleaning the operating components of a video player/recorder of the VHS type.

A video player/recorder will hereinafter be referred to simply as "A Video Unit".

Cleaning apparatus for cleaning the operating components of a video unit is known, such apparatus comprising a cassette housing corresponding to the standard of the particular Video Unit involved (e.g. VHS, Beta, Philip's 2000) so that is can be inserted into the unit in substitution for a cassette proper, but containing instead a special tape which has a certain degree of surface roughness to clean the components of the video unit past which it travels. An example of such a cleaning apparatus is described in the Specification of U.S. Ser. No. 500,852, filed June 3, 1983 which is a continuation-in-part of U.S. Ser. No. 332,333 filed The cleaning apparatus described in U.S. Ser. No. 500,852 basically comprises a cassette housing a pair of spools on which a cleaning ribbon is wound. The cassette also has a stop mechanism which functions to stop the operation of the Video Unit at the completion of a cleaning cycle. The stop mechanism comprises a rotatable shield adapted to be located over a light source in the Video Unit, the shield having an aperture for directing a beam of light from the light source to left hand and right hand shut off devices in the Video Unit. Furthermore, the stop mechanism includes a drive transmission adapted to be operatively engaged with one of the spools of the Video Unit to rotate the shield, thus effecting directional control of the beam of light from the light source. The cassette also houses an adjustable cleaning cartridge which is adapted when it is in one of two operating positions to clean the capstan and pinch roller of the Video Unit.

The cleaning apparatus described in U.S. Ser. No. 500,852 has a number of disadvantages. One disadvantage is that the rotatable shield is engaged via the drive transmission directly with one of the spools and no indicator is provided for indicating the position of the aperture in the rotatable shield. Thus, since the cleaning cycle is determined by the initial position of the aperture in the rotatable shield, the user is unaware of whether or not the aperture is correctly positioned for the start of a cleaning cycle. This problem is exaggerated by the fact that the spools may be inadvertently rotated by a person, thus rotating the shield to an undesirable position which may result in an extremely long cleaning cycle.

Another problem is that in a Video Unit having an automatic rewind facility, at the end of a cleaning cycle the contaminated cleaning ribbon is rewound onto the spool from which it was initially unwound. Thus, unless the ribbon is moved from one spool to the other by manually rotating the spools, then the next time the cleaning apparatus is used in the Video Unit cross contamination may result i.e. after one section of the ribbon has been used once, residue collected on that section of the ribbon may be deposited back on the components in the Video Unit, when that section of ribbon is used again. Furthermore, the user is unaware when he has sufficiently rotated the spools to bring a fresh section of ribbon into position and this may result in either, cross contamination as described above, or in part of the ribbon not being used at all which is consequently inefficient.

Another problem is that if the cleaning apparatus is used in a Video Unit which does not have the automatic rewind facility, then at the end of a cleaning cycle the aperture in the shield is situated such that the light beam is directed at the left hand shut off device. Thus, unless the shield is moved by manually rotating the spools then the next time one attempts to use the cleaning apparatus in the Video Unit the aperture in the shield is still situated such that light is directed at the left hand shut off device and consequently no cleaning will occur. Indeed the user may be unaware that no cleaning has occured.

Further problems with the cleaning apparatus described in U.S. Ser. No. 500,852 relates to the adjustable cleaning cartridge. When the cartridge is in the left hand position the cleaning ribbon is not engaged between the capstan and pinch roller, however, the capstan and pinch roller are cleaned by the felt pads. Furthermore, cleaning ribbon is brought into contact with the various components in the Video Unit for example the Video and audio heads. Since in some Video Units the cleaning ribbon is not caused to move through the Video Unit unless the ribbon is engaged between the capstan and pinch roller, then a disadvantage with the left hand position of the cleaning cartridge is that the video drum may rotate against a stationary cleaning ribbon and this may cause the video head to heat up which is undesirable.

Another disadvantage with the left hand position of the cleaning cartridge, is that since the cleaning ribbon is not moving then the shut off devices cannot be activated because the shield is not being rotated. Thus, the cleaning apparatus will maintain the Video Unit in this condition until the latter is switched off manually. Once again the user of the cleaning apparatus may not be aware that no cleaning is taking place or he may think his Video Unit is broken. It will be understood then in some Video Units, an imbalance of tension between the two spools may cause the cleaning ribbon to move, however it is likely that this movement would be somewhat erratic.

If the adjustable cleaning cartridge is moved to the right hand position, then the cleaning ribbon is engaged between the capstan and pinch roller. However, this position has the disadvantage that the pinch roller is no longer separately cleaned. A further disadvantage with this right hand position of the cartridge is that the cartridge blocks the light beam path from the light source to the right hand shut off device and consequently a system of mirrors and a lens is required to direct the light beam around the cartridge to the right shut off device. Another disadvantage with the cartridge is that the cleaning ribbon is permanently engaged with the cartridge and thus in order to replace the cartridge it is necessary to remove the cartridge and the entire cleaning ribbon from the cleaning apparatus.

It is therefore an object of the present invention to provide improvements in cleaning apparatus for cleaning the operating components of a Video Unit which improvements overcome or at least reduce the above stated disadvantages and problems.

According to a first aspect of the invention there is provided a cleaning apparatus to clean the operating components of a Video Unit which Video Unit includes, a structure defining an operating location to receive a tape cassette, at least one head member which has a head surface that is subject to contamination, guide means adapted to engage location and move said tape outwardly to a head engaging location, a capstan and pinch roller at a capstan and pinch roller location to engage the tape and move said tape through the playing and/or recording apparatus, drive spindles to engage spools of the tape cassette so as to cause rotation of the same, the cleaning apparatus comprising, a cassette housing adapted to be positioned in the operating location of the Video Unit, said cassette housing having a forward end, a rear end and first and second side portions, a cleaning ribbon having a lengthwise axis and positioned in said cassette housing so as to have a guide engaging ribbon portion which, with said cassette housing located in the operating location, is positioned to be engaged by said guide means and moved from said cassette housing into a cleaning position to be in cleaning engagement with at least said head, the ribbon being so mounted in the cassette housing so as to be able to travel from and into the cassette housing in a path along the lengthwise axis of the ribbon, a capstan and pinch roller cleaning device, mounted in the cassette housing and having a cleaning pad including a pair of cleaning surfaces adapted to engage with the capstan and pinch roller, in cleaning engagement therewith and arranged such that the ribbon is engaged by the capstan and pinch roller in its path along the lengthwise axis of the ribbon and the capstan is in use located between the ribbon and one of the cleaning surfaces.

Preferably, the capstan and pinch roller cleaning device comprises a pair of spaced apart side frame members secured together and adapted to be secured in the cassette housing, each side frame member having a resiliently mounted support arm.

The cleaning pad preferably comprises, a capstan cleaning felt securely mounted on one of the support arms and a pinch roller cleaning felt securely mounted on the other of the support arms, such that, both cleaning felts are spaced apart, and in use of the cleaning apparatus, the cleaning ribbon passes between them and the side frame members and furthermore the capstan is located between the cleaning ribbon and the capstan cleaning felt to be in cleaning engagement with the capstan cleaning felt.

The support arms and cleaning felts are preferably adapted to be in open relation, so that the cleaning ribbon can be removed from the capstan and pinch roller cleaning device, while the latter is in the cleaning apparatus, thus permitting the removal of the cleaning device from the cleaning apparatus without removal of the cleaning ribbon.

According to a second aspect of the invention there is provided a cleaning apparatus to clean the operating components of a Video Unit, which Video Unit includes:

a structure defining an operating location to receive a tape cassette, at least one head member which has a head surface that is subject to contamination, guide means adapted to engage a tape of said tape cassette at a tape engaging location and move said tape outwardly to a head engaging location, a capstan and pinch roller at a capstan and pinch roller location to engage the tape and move said tape through the playing and/or recording apparatus, drive spindles to engage spools of said tape cassette so as to cause rotation of the same, a shut off mechanism comprising a light source and first and second shut off devices spaced from one another, said shut off devices being responsive to light from the light source, said shut off devices being positioned so that when the tape cassette is in the operating location, the tape is positioned to interrupt a light beam travelling a light beam path between the light source and the first shut off device, and when a shut off leader of said tape is at said light beam path, said shut off mechanism is activated, the cleaning apparatus comprising:

a cassette housing adapted to be positioned in the operating location of the Video Unit, said cassette housing having a forward end, a rear end and first and second side portions, a cleaning ribbon having a lengthwise axis and positioned in said cassette housing so as to have a guide engaging ribbon portion which, with said cassette housing located in the operating location, is positioned to be engaged by said guide means and moved from said cassette housing into a cleaning position to be in cleaning engagement with at least said head, the ribbon being so mounted in the cassette housing so as to be able to travel from and into the cassette housing in a path along the lengthwise axis of the ribbon, a stop mechanism comprising a shutter member having a beam interrupting position to interrupt the light beam between the light source and said shut off device, and a beam transmitting position to permit the light beam to travel on the light beam path between the shut off devices, and drive means for causing intermittent rotational movement of the shutter member between first and second positions in response to rotation of one of said drive members.

Preferably the shutter member has apertures adapted such that, the light beam is directed away from the shut off devices in the Video Unit, when the shutter member is in its first position.

The shutter member is preferably adapted, such that, when it is in an intermediate position between said first and second positions, a first aperture permits a first light beam to travel on a light beam path to activate the second shut off device in the Video Unit thus preventing automatic rewind of the cleaning ribbon.

The shutter member is also preferably adapted such that, when it moves from the intermediate position to the second position, the first aperture continues to permit the light beam, to activate the second shut off device and a second aperture permits a second light beam to activate a first shut off device in the Video Unit, thus preventing forward motion of the cleaning ribbon and shuts off the Video Unit at the end of the cleaning cycle.

The drive means preferably comprises a gear wheel engaged with corresponding gear teeth in one of the drive members in the cleaning apparatus, the gear wheel having a downwardly projecting tooth on its underside.

The shutter member preferably has a plurality of spaced apart, radially extending tangs projecting from it's circumference.

The gear wheel and shutter member are preferably adapted such that, in use of the cleaning apparatus, each rotation of the gear wheel causes one tang of the shutter to be engaged by the tooth on the gear wheel, to rotate the shutter a predetermined angular distance which causes the adjacent tang to be positioned, such that, it will be engaged by the tooth on the following rotation of the gear wheel. The shutter member preferably projects through one surface of the cleaning apparatus, is manually rotatable, and has a position indicator so that the shutter can be set at its first position at the start of a cleaning cycle.

It will be apparent that both aspects of the invention will advantageously be incorporated into one cleaning apparatus for cleaning the operating components of a Video Unit.

The invention will be understood from the following description thereof, given by way of example, with reference to the accompanying drawings in which.

For the purpose of clarity of description, the reader is referred to the Specification of U.S. Ser. No. 500,852 from which it will be understood, that the following description, relates in general to the differences between those aspects of the present invention and that described in the aforementioned Specification.

Figure 1:
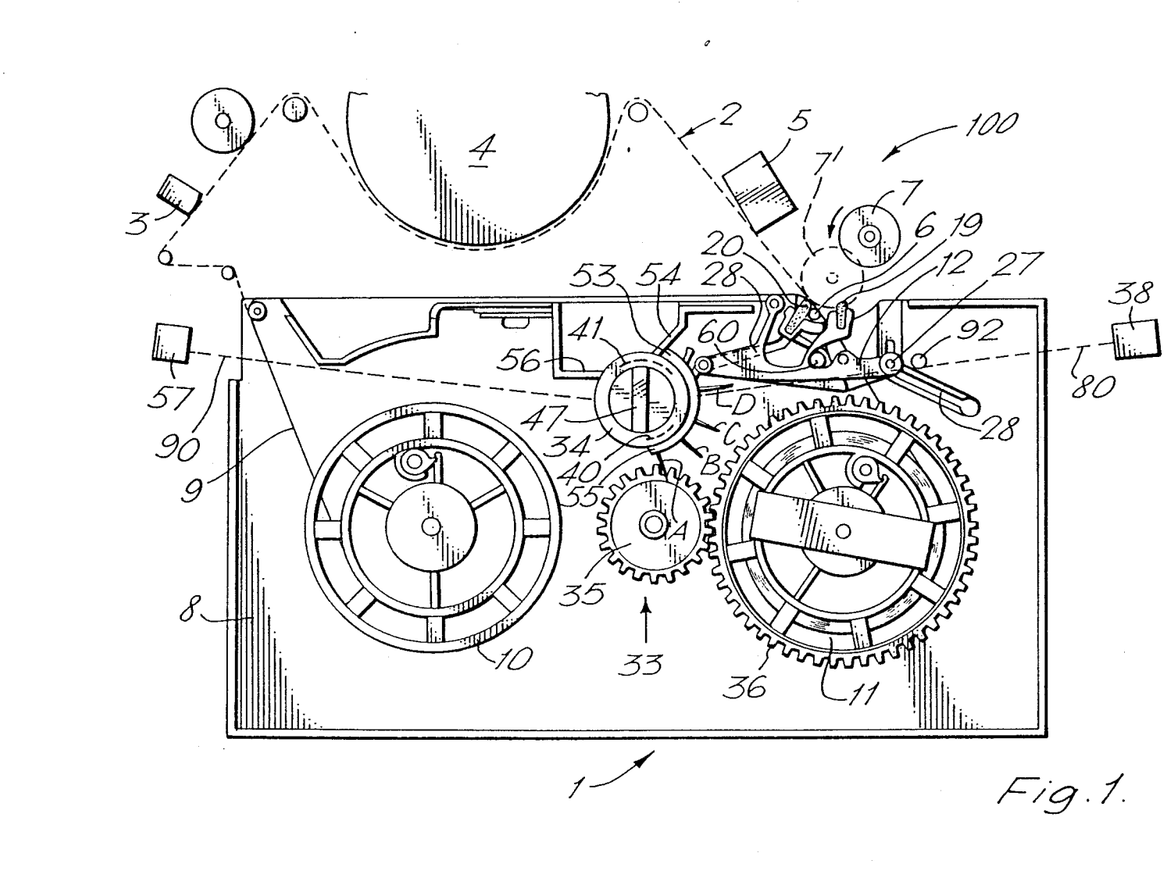
FIG. 1 is a simplified top plan view of a cleaning apparatus incorporating both aspects of the present invention, with the top cover of the cleaning apparatus removed and showing certain components of a Video Unit.

Referring now to the drawings wherein similar numerals have been used to indicate like parts, there is shown therein a cleaning apparatus 1 for cleaning the operating components disposed along the tape path indicated in dotted outline at 2 of a Video Unit 100. The main components in the Video Unit 100, past which a video tape moves, are schematically shown in FIG. 1 and are as follows, an erase head 3, a rotating video head 4 and an audio head 5. The Video Unit 100 further comprises a capstan 6 and a pinch roller 7. The pinch roller 7 as shown in FIG. 1 is spaced from the capstan 6, however, during operation of the Video Unit 100, the pinch roller 7 moves to a position adjacent the capstan 6, so as to engage a magnetic tape therebetween and cause the magnetic tape to move at a controlled rate through the Video Unit 100.

The cleaning apparatus 1 comprises a generally rectangular cassette housing 8, having the same overall configuration of the housing of a conventional tape cassette that is played in the Video Unit 100. A cleaning ribbon 9 is wound on left and right spools 10, 11 respectively, these spools 10, 11, being located in the same manner as spools of a conventional cassette. The cassette 8 further comprises a capstan and pinch roller cleaning device 12 more clearly shown in FIG. 2. The capstan and pinch roller cleaning device 12 comprises a pair of spaced apart side frame members 13, 14 having resiliently mounted support arms 15, 16 respectively. The support arms 15, 16 and the respective frame members 13, 14 are preferably integrally formed. The upper portion of each support arm 15, 16 projects crosswise between the side frame members 13, 14. The support arms 15, 16 have uppermost slots 17, 18 respectively in which is securely located a pinch roller cleaning felt 19 and a capstan cleaning felt 20.

Figure 2:
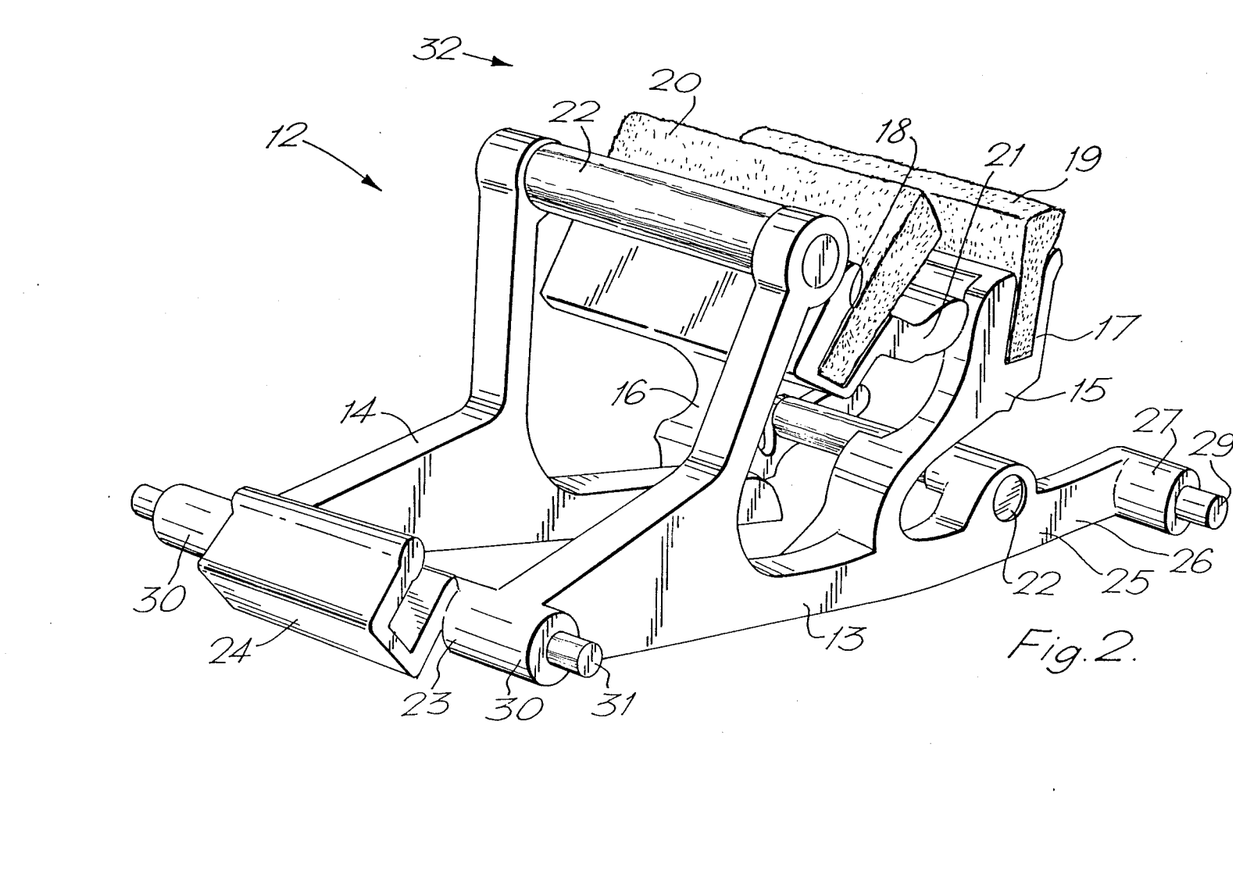
FIG. 2 is a perspective view of the capstan and pinch roller cleaning device according to the present invention.
Figure 3:
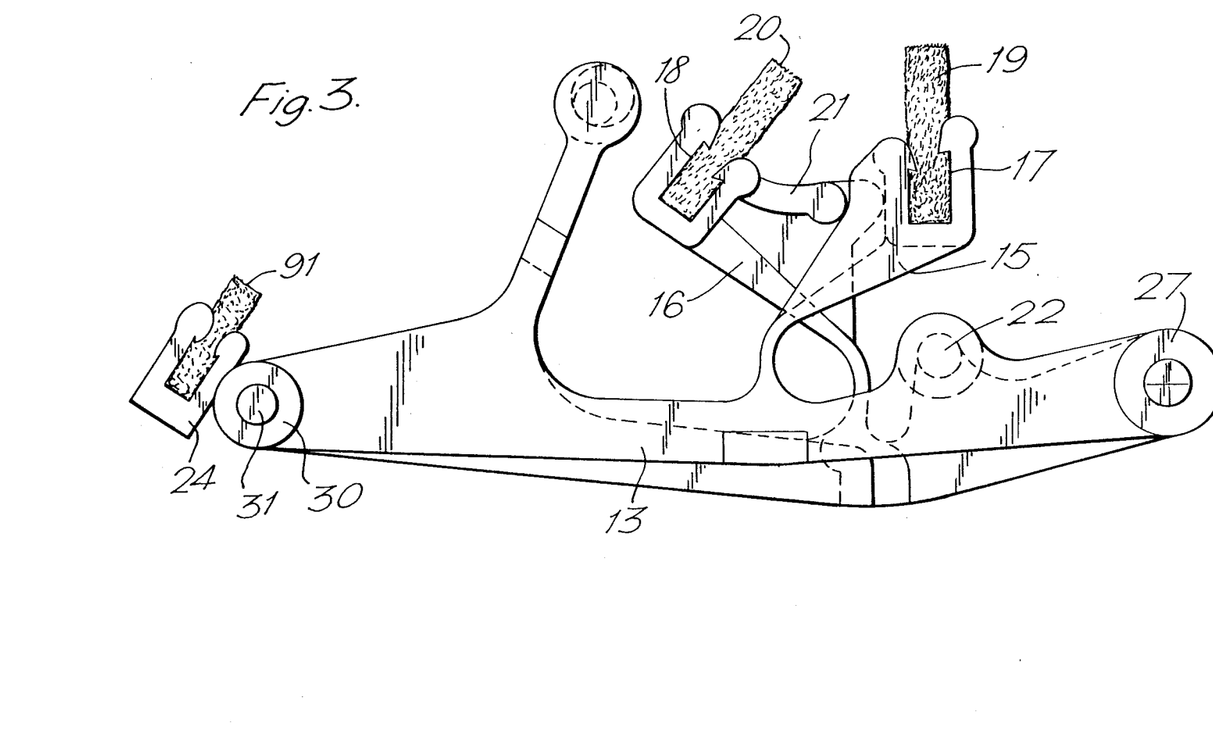
FIG. 3 is a side view of the capstan and pinch roller cleaning device of FIG. 2.

Furthermore, the support arms 15, 16 are spaced apart in open relation in the direction of the longitudinal axis of the side frame members 13, 14. The support arm 16 has a projecting flange 21 projecting toward the support arm 15. The side frames 13, 14 are held together by means of pins 22 in conventional manner. Mounted on one end 23 of the clenaing device 12 is a housing 24 for a cleaning felt 91 the function of which will be described below. The end 25 of each side frame member 13, 14, has a projecting flexible arm 26 only one of which is shown. Each arm 26 has an integrally formed transverse pin 27 which rides in slots 28 in the cassette housing 8 and can be located in suitable recesses 29 in the cassette housing 8. The end 23 of the cleaning device 12 has a pair of protruding side members 30 through which a pin 31 projects. The pin 31 serves to hold the side frame members together and the ends of the pin 31 and the adjacent side member 30 can ride in another slot 28 in the cassette housing in conventional manner. It will be understood that a cleaning ribbon 9 can pass between the upper portions of the support arms 15, 16 as shown in FIG. 1.

It will be further understood that the position of the cleaning device 12, in the cassette housing 8, as shown in FIG. 1, in such, that when the cleaning apparatus 1 is placed in the existing playing location of the Video Unit 100, the capstan 6 is located between the cleaning ribbon 9 and the capstan cleaning felt 20.

Furthermore, the cleaning ribbon 9 can be inserted into, or removed from, a position between the support arms 15, 16 by prising the support arms 15, 16 apart and inserting or removing the cleaning ribbon 9, at the rear of the cleaning device 12, indicated by the arrow 32 in FIG. 2.

The cassette housing 8 also includes a stop mechanism 33 comprising a generally cylindrical shutter member 34 and a gear wheel 35 engaged with gear teeth 36 in the spool 11. The shutter member 34 fits over a light source (not shown), which already exists in the Video Unit 100, as part of the existing shut off mechanism of the Video Unit 100. In the normal operation of a conventional tape cassette, there is a portion of a clear leader at each end of the magnetic tape. When this clear leader unwinds from either of the spools, it permits the light source to shine through to activate either a first shut off device 37, or a second shut off device 38, these devices 37 and 38 being existing components of the Video Unit 100.

Figure 4:
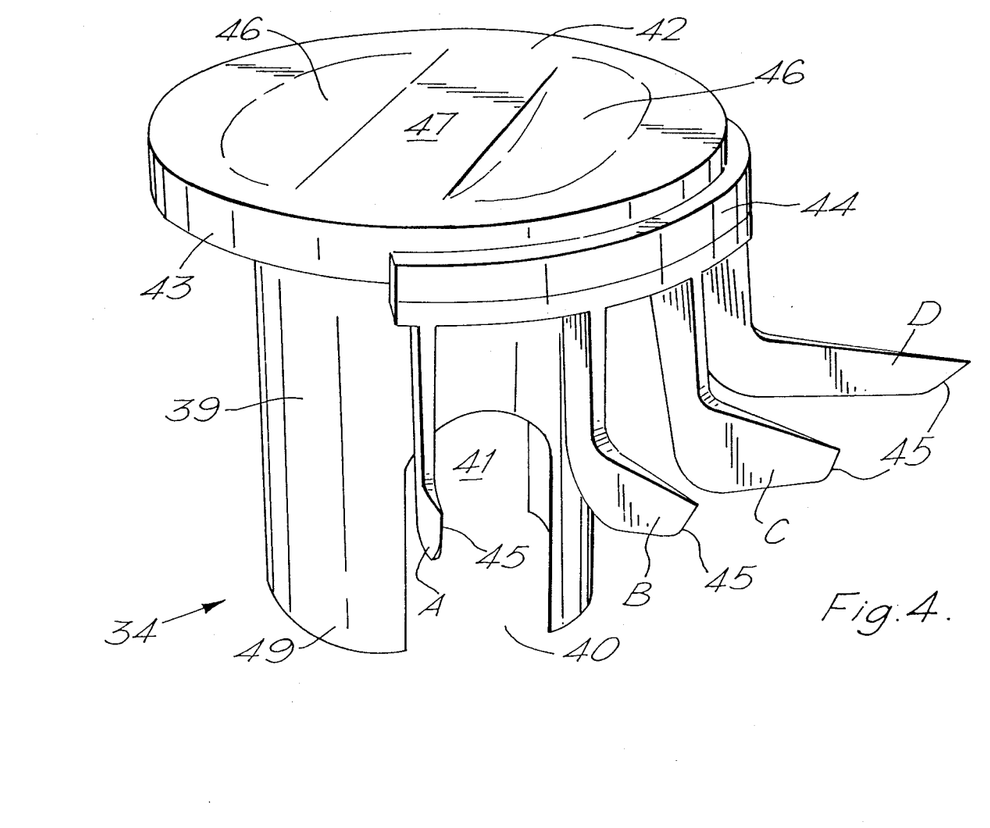
FIG. 4 is a perspective view of the shutter member according to the present invention.

Referring to FIG. 4, the shutter member 34 is shown more clearly and comprises a hollow cylindrical wall 39 having opposed apertures 40, 41. The aperture 41 extends for a greater circumferential distance than the aperture 40 as is shown in dotted outline in FIG. 5. The shutter member 34 has a top portion 42 having a projecting lip 43. Mounted on substantially one half of the circumference of the lip 43, is a flange 44, carrying four radially extending tangs A, B, C and D. The outermost edge 45 of each of the tangs A, B, C and D slopes backwards towards the wall 39. The top portion 42 of the shutter member 34 has a pair of recesses 46 defining therebetween a position indicator 47.

Figure 5:
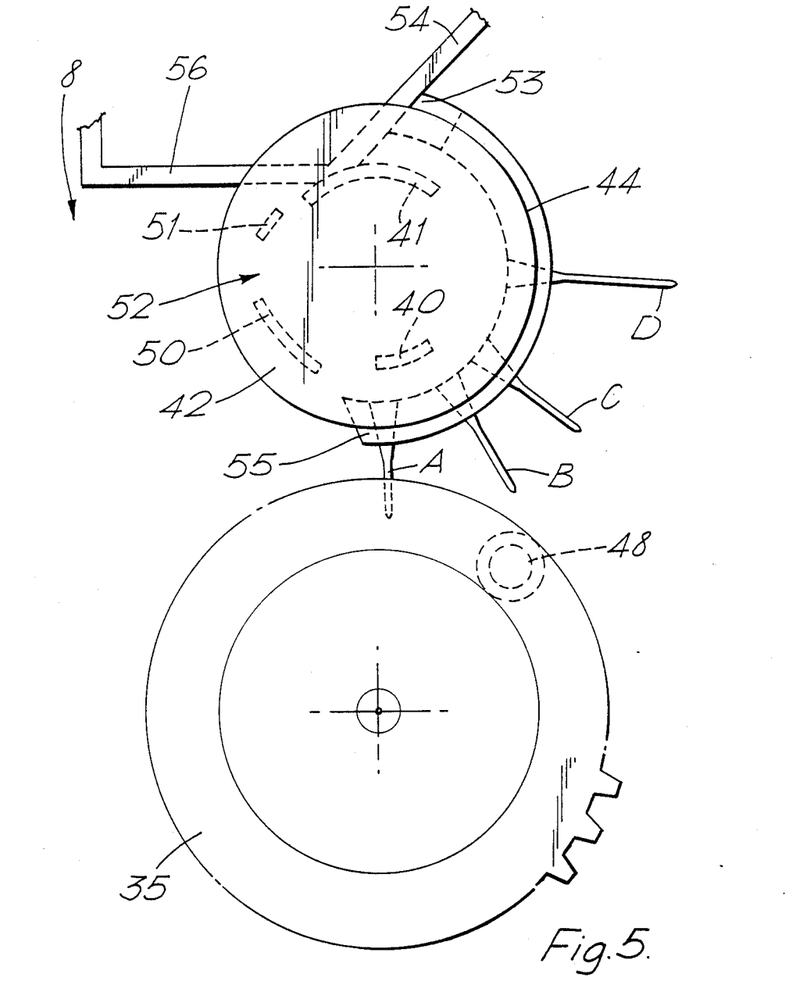
FIG. 5 is an enlarged plan view showing the positional arrangement of the gear wheel and the shutter member of FIG. 1.

The gear wheel 35 has a downwardly projecting tooth 48 on its underside which tooth 48 in use of the cleaning apparatus 1 is adapted to intermittently engage with the tangs A, B, C and D as is shown in FIG. 5.

The bottom 49 of the cylindrical wall 39 of the shutter member 34 is rotatably mounted in a recess (not shown) in the cassette housing 8. Projecting upwardly in the cassette housing 8 adjacent the shutter member 34 is a pair of screen members 50, 51, defining an aperture 52 therebetween. The screen members 50, 51 are shown in dotted outline in FIG. 5.

The shutter member 34 as shown in FIGS. 1 and 5, is in a first position at the beginning of a cleaning cycle, such that, light from the light source is directed away from the shut off devices 37, 38 in the Video Unit 100. In this first position of the shutter member 34, the end 53 of the flange 44, abuts a first wall in the top cover (not shown) of the cassette housing 8, which first wall, corresponds with the wall 54 in the cassette housing 8, as shown in FIGS. 1 and 5. Furthermore, in the first position of the shutter member 34, the position indicator 47 is substantially perpendicular with a notional line, joining the centres of the spools 10, 11. A second position of the shutter member 34, is substantially defined when the shutter member 34 is rotated, such that, the end 55 of the flange 44 abuts a second wall in the top cover (not shown), of the cassette housing 8, which second wall corresponds with the wall 56, in the cassette housing 8. The top 42 of the shutter member 34 projects into an aperture in the top cover (not shown) of the cassette housing 8 so that the shutter member 34 may be manually rotated.

The cassette housing 8 has a cylindrical upwardly projecting stop 60, which, serves to adjust the position of the support arms 15, 16 if necessary, so that the capstan 6 and pinch roller 7 are in use of the cleaning apparatus 1, in cleaning engagement with the capstan cleaning felt and pinch roller cleaning felt 20, 19 respectively.

The operation of a cleaning cycle of the cleaning apparatus 1 will now be described. The cleaning apparatus 1 is placed in the existing playing location of the Video Unit 100. The cleaning ribbon 9 is wound mostly on the spool 10 and attached to the spool 11, but not being wound thereon to any great extent. The shutter member 34 is in its first position as hereinbefore described so that light from the light souce is not directed at the shut off devices 37, 38. The start button or knob (not shown) of the Video Unit 100, is moved to its operating position thus causing the video tape guide members of the Video Unit 100 to move the cleaning ribbon 9, outwardly to the tape path 2 so that it comes into engagement with the operating components of the Video Unit 100. The pinch roller 7 moves rearwardly toward the capstan 6 to the position shown in dotted outline at 7', such that, the capstan 6 rotates against the capstan cleaning felt 20 and is cleaned thereon and the pinch roller 7 rotates against the pinch roller cleaning felt 19 to be cleaned thereon. Furthermore the capstan 6 and pinch roller 7 engage the cleaning ribbon 9 to move it along the tape path 2. Thus the cleaning ribbon 9 comes into wiping engagement with the operating components of the Video Unit 100. Furthermore, due to normal operation of the Video Unit 100, the spools 10, 11 begin rotating in a clockwise direction and the cleaning ribbon 9 is unwound from the spool 10 and wound onto the spool 11, the cleaning ribbon 9 passing between the support arms 15, 16 of the cleaning device 12.

As the spool 11 rotates clockwise it causes the gear wheel 35 to rotate anti-clockwise and the tooth 48, on the underside of the gear wheel 35, engages with the tang A on the shutter member 34 thus causing the shutter member 34 to be rotated a predetermined angular distance, which causes the tang B to be positioned, such that it will be engaged by the tooth 48 on the following revolution of the gear wheel 35.

By the time the spools 10, 11 have rotated approximately one and a half revolutions, the shutter member 34 is in an intermediate position, such that, the tang D is positioned to be engaged and angularly rotated by the tooth 48 during the next revolution of the gear wheel 35. In this intermediate position of the shutter member 34, the aperture 41 is aligned with the second shut off device 38, to permit a first light beam from the light source to travel a light beam path 80 and activate the second shut off device 38 in the Video Unit 100, thus preventing automatic rewind of the cleaning ribbon 9. It will be appreciated that the cleaning ribbon 9 is made of a fibrous material well known in the art, so that sufficient light energy can pass through the cleaning ribbon 9 to activate the second shut off device 38. Further in this intermediate position of the shutter member 34, the screen member 50 prevents light from the aperture 40 from travelling to and activating the first shut off device 37.

When the gear wheel 35 rotates such that the tooth 48 engages with the tang D and angularly rotates the shutter member 34 to its second position, the aperture 41 continues to permit the first light beam to activate the second shut off device 38, and the aperture 40 moves into register with the aperture 52 between the screen members 50, 51 to permit a second light beam to travel a light beam path 90 to activate the first shut off device 37 in the Video Unit 100. Thus further forward motion of the cleaning ribbon 9 is prevented and the Video Unit 100 is shut off at the end of the cleaning cycle.

When it is desired to clean the Video Unit 100 again it is only necessary to manually rotate the shutter member 34 to its first position as hereinbefore described. Since the cleaning ribbon 9 is prevented from being removed rewound onto the spool 10, the next cleaning cycle will move a substantially fresh section of cleaning ribbon through the Video Unit 100, thus substant-ially preventing cross contamination. Advantageously, the cleaning ribbon 9 will be of a length such that a plurality of cleaning cycles will be possible with the cleaning ribbon 9.

Figure 6:
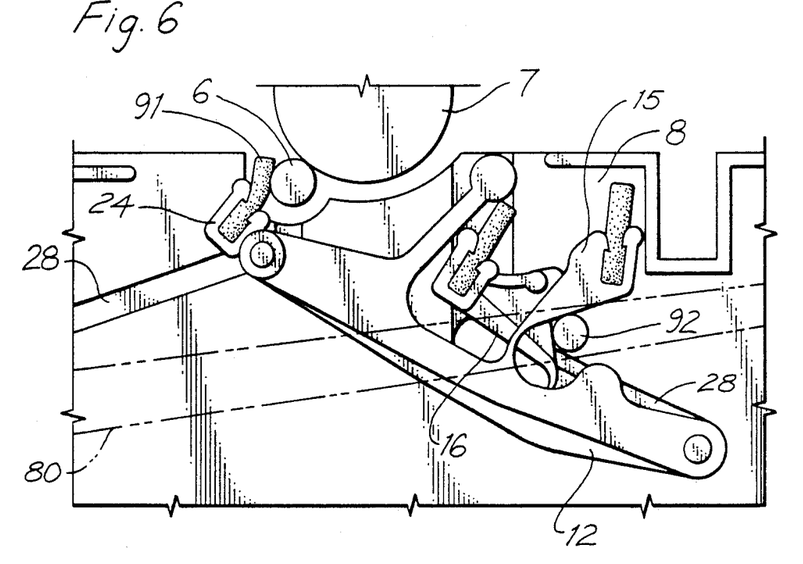
FIG. 6 shows an alternative position of the capstan and pinch roller cleaning device in the cleaning apparatus of FIG. 1.

Referring now to FIG. 6, if desired, the cleaning device 12 may be moved to a position 12' substantially to the right of that shown in FIG. 1, to establish the usual video tape path geometry within the cleaning apparatus 1 and the Video Unit 100. In this position, the housing 24 of the cleaning device 12, has a capstan cleaning felt 91 for cleaning engagement with the capstan 6. Furthermore, the cleaning cassette housing 8 and its top cover each have a projecting stop member 92 which engage with the support arms 15, 16 of the cleaning device 12 to bias the support arms 15, 16 out of the light beam path 80 thus enabling the stop mechanism 33 to function.

Thus, since the support arms 15, 16 can be maintained out of the light beam path 80 by the stop members 92, there in no requirement for a system of mirrors in the cleaning apparatus 1.

The main advantages of the invention are as follows;
1. Independent cleaning action is permitted of the capstan, the pinch roller, and the operating components of the Video Unit.
2. The shutter member is readily manually positioned at the start of a cleaning cycle.
3. Since the spools are not directly and permanently engaged with the shutter member, rotation of the spools does not prevent accurate positioning of the shutter member at the start of a cleaning cycle.
4. The cleaning device is readily removable from the cassette housing without requiring removal of the cleaning ribbon.
5. After one cleaning cycle a fresh section of ribbon is automatically in place for the next cleaning cycle.
6. Cross contamination is prevented.
7. The cleaning ribbon moves through the video unit in a similar manner to a conventional video tape as it is driven by the capstan and pinch roller.
8. No mirrors are required for directing the light beams around obstacles.

Other advantages of the invention will have become apparent from the above description.

The invention is not limited to the embodiment described herein and may be modified or varied without departing from the scope of the invention.

I claim:

1. A cleaning apparatus for cleaning operating components of a video player/recorder (100) characterized in that said cleaning apparatus includes a cassette housing (8), a cleaning ribbon (9) mounted in the cassette housing (8), a capstan and pinch roller cleaning device (12) mounted in the cassette housing (8) and having a cleaning pad means including a pair of cleaning surfaces (19,20) adapted to, in use, engage with a pinch roller (7) and capstan (6) of the video player/recorder (100) in cleaning engagement therewith and arranged such that the cleaning ribbon (9) is engaged by the capstan (6) and pinch roller (8) in its path along a lengthwise axis (2) of the cleaning ribbon (9) and the capstan 6 is located between the cleaning ribbon (9) and one of the cleaning surfaces (20).

2. A cleaning apparatus as claimed in claim 1, wherein said video player/recorder has a shut off mechanism, characterized in that said cleaning apparatus has a stop mechanism (33) including a shutter member (34) having a beam interrupting position to interrupt as light beam between a light source and shut off devices (37,38), and a beam transmitting position to permit the light beam to travel between first and second shut off devices (37,38) and drive means (35) for causing intermittent rotational movement of the shutter member (34) between first and second positions in response to rotation of a drive member (11).

3. A cleaning apparatus as claimed in claim 2 characterised in that, the shutter member 34 has first and second apertures (41,40) adapted such that the light beam is directed away from the shut off device (37,38) in the video unit when the shutter member (34) is in its first position.

4. A cleaning apparatus as claimed in claim 3, characterised in that, when the shutter member (34) is in an intermediate position between first and second positions, said first aperture (41) permits a first light beam to travel on a light beam path (80) to activate the second shut off device (38) in the video player/recorder (100) to prevent automatic rewind of the cleaning ribbon.

5. A cleaning apparatus as claimed in claim 4, characterised in that, when the shutter member (34) is in a second position, the first aperature (41) continues to permit the first light beam to activate the second shut off device (38) and the second aperture (40) permits a second light beam to travel a second light beam path (90) to activate the first shut off device (37) in the video player/recorder (100), to prevent forward motion of the cleaning ribbon (9) and shut off the video player/recorder (100) at the end of a cleaning cycle.

6. A cleaning apparatus as claimed in claim 5, characterised in that, the drive means includes a rotatable gear wheel (35) engaged with co-operating gear teeth (36) in one of the drive members (11,) the gear wheel (35) having a downwardly projecting tooth (48) on its underside, the shutter member (34) having a plurality of spaced apart radial tangs (A, B, C, D) extending from the circumference thereof, and arranged such that, in use of the cleaning apparatus (1) each rotation of the gear wheel (35) causes one tang to be engaged by the tooth (48), to rotate the shutter member (34) a predetermined angular distance, which causes the adjacent tang to be positioned, such that, it is engaged by the tooth (48) on the following rotation of the gear wheel (35).

7. A cleaning apparatus as claimed in claim 6, characterised in that, the shutter member (34) projects through one surface of the cleaning apparatus (1) is manually rotatable, and has a position indicator (47) so that it can be set in its first position at the start of a cleaning cycle.

8. A cleaning apparatus as claimed in claim 1, characterised in that, the capstan and pinch roller cleaning device (12) has a pair of spaced apart side frame members (13, 14) secured together and adapted to be secured in the cassette housing (8) each side frame member (13, 14) having a resiliently mounted support arm (15, 16) respectively, the support arms (15, 16) having secured thereon the pinch roller and capstan cleaning members (19, 20) respectively such that the cleaning members (19, 20) are spaced apart and in use of the cleaning apparatus (1), the cleaning ribbon (9) passes between the cleaning members (19, 20) and the side frame members (13, 14).

9. A cleaning apparatus as claimed in claim 1, characterised in that, the capstan and pinch roller cleaning device (12) has a pair of spaced apart side frame members (13, 14) secured together and adapted to be secured in the cassette housing (8) each side frame member (13, 14) having a resiliently mounted support arm (15, 16) respectively, the support arms (15, 16) having secured thereon pinch roller and capstan cleaning pads (19, 20) respectively such that the cleaning pads (19, 20) are spaced apart and in use of the cleaning apparatus (1), the cleaning ribbon (9) passes between the cleaning pads and the side frame members (13, 14) and the capstan (6) is located between the cleaning ribbon (9) and the capstan cleaning pad (20) and in cleaning engagement with the capstan cleaning pad (20).

10. A cleaning apparatus as claimed in claim 9, characterised in that, the support arms (15, 16) and cleaning pads (19, 20) are adapted to be in open relation so that the cleaning ribbon (9) can be removed from the capstan and pinch roller cleaning device (12) while the cleaning ribbon (9) is in the cleaning apparatus (1) to permit removal of the cleaning device (12) from the cleaning apparatus (1) without removal of the cleaning ribbon (9).

11. A cleaning apparatus as claimed in claim 9, characterised in that, the support arms (15, 16) and cleaning members (19, 20) are adapted to be in open relation so that the cleaning ribbon (9) can be removed from the capstan and pinch roller cleaning device (12) while the cleaning ribbon (9) is in the cleaning apparatus (1) to permit removal of the cleaning device (12) from the cleaning apparatus (1) without removal of the cleaning ribbon (9).

12. A cleaning apparatus as claimed in claim 9, characterised in that, the support arms (15, 16) and cleaning members (19, 20) are adapted to be in open relation so that the cleaning ribbon (9) can be removed from the capstan and pinch roller cleaning device (12) while the cleaning ribbon (9) is in the cleaning apparatus (1) to permit removal of the cleaning device (12) from the cleaning apparatus (1) without removal of the cleaning ribbon (9).

13. A cleaning apparatus for cleaning operating components of a video player/recorder characterized in that said cleaning apparatus includes a cassette housing (8), a cleaning ribbon (9) mounted in the cassette housing (8), a capstan and pinch roller cleaning device (12) mounted in the cassette housing (8) and having a cleaning pad means including a pair of cleaning members (19, 20) adapted to, in use, engage with a pinch roller (7) and capstan (6) of the video player/recorder (100) in cleaning engagement therewith and arranged such that the cleaning ribbon (9) mounted in said cassette housing is engaged by the capstan (6) and pinch roller (7) in its path along a lengthwise axis (2) of the cleaning ribbon (9) and the cleaning ribbon (9) is positioned between the cleaning members (19, 20).

14. A cleaning apparatus as claimed in claim 13, wherein at least one of said cleaning members is mounted to a support arm (15 or 16) which is in turn mounted to said cleaning device (12).

15. A cleaning apparatus as recited in claim 14, wherein said arm is resiliently mounted to said cleaning device so as to be movable toward, and away from, a cleaning location.

16. A cleaning apparatus as recited in claim 15, wherein said arm is positioned to engage said pinch roller in cleaning engagement and is resiliently urged toward cleaning engagement with said pinch roller.

17. A cleaning apparatus as recited in claim 16, wherein said arm is provided with an open portion to permit said cleaning ribbon to pass therethrough.

18. A cleaning apparatus as recited in claim 14, wherein said arm is provided with an open portion to permit said cleaning ribbon to pass therethrough.

19. A cleaning apparatus to clean a playing and/or recording apparatus, wherein said player and/or recording apparatus comprises:
 a. a structure defining an operating location to receive a tape cassette in an operating position at the operating location;
 b. guide means adapted to engage a tape of said tape cassette at a tape engaging location and move said tape outwardly;
 c. a capstan at a capstan location to engage one side of said tape;
 d. a pinch roller that is movable relative to said capstan between a first non-operating location spaced from the capstan and a second operating location adjacent to the capstan so as to be able to engage a second side of the tape and press the tape against the capstan;

said cleaning apparatus comprising:
 a. a cassette housing adapted to be positioned in the operating location of the playing and/or recording apparatus;
 b. a cleaning ribbon which in a retracted position extends along a forward edge portion of the housing, and which, with the cassette housing located in the operating location, is located to be engaged by said guide means and moved from said housing into a cleaning position;
 c. a capstan and pinch roller cleaning device mounted in said cassette housing and comprising: 1. a capstan cleaning portion which, with the cassette housing located in said operating location, is positioned adjacent the capstan location to be in cleaning engagement with the capstan at a first cleaning engagement location; 2. a pinch roller cleaning portion which, with the cassette housing located in said operating location, is positioned adjacent the second operation location of the pinch roller to be in cleaning engagement with the pinch roller at a second cleaning engagement location;
 d. said ribbon being positioned to reach between said capstan cleaning portion and said pinch roller cleaning portion, so as to be located between said first and second engagement locations, when cassette housing is in said operation location;

whereby, with the cassette housing in said operating location, and upon operation of said playing and/or recording apparatus, said pinch roller and capstan grip the ribbon to move the ribbon along the length of the ribbon, and the capstan cleaning portion and the pinch roller cleaning portion are in cleaning engagement with the capstan and pinch roller respectively.

20. The apparatus as recited in claim 19, wherein said pinch roller cleaning portion comprises a mounting arm having a first outer end cleaning portion adapted to receive a cleaning pad therein, and a second inner mounting portion, with the mounting arm being pivotally mounted to the cassette housing at a location, said mounting arm being resiliently mounted so that the end cleaning portion is able to move toward and away from said pinch roller when the cassette housing is in said operating location.

21. The apparatus as recited in claim 20, wherein said mounting arm is provided with opening means positioned between said end cleaning portion and said mounting portion so that said ribbon extends through said opening means.

22. A capstan and pinch roller cleaning cartridge adapted to be mounted in a cassette cleaner to clean a playing and/or recording apparatus, wherein said playing and/or recording apparatus comprises:
 a. a structure defining an operating location to receive a tape cassette in an operating position at the operating location;
 b. guide means adapted to engage a tape of said tape cassette at a tape engaging location and move said tape outwardly;
 c. a capstan at a capstan location to engage one side of said tape;
 d. a pinch roller that is movable relative to said capstan between a first non-operating location spaced from the capstan and a second operating location adjacent to the capstan so as to be able to engage a second side of the tape and press the tape against the capstan;

and wherein said cassette cleaner comprises:
- a. a cassette housing adapted to be positioned in the operating location of the playing and/or recording apparatus;
- b. a cleaning ribbon which in a retracted position extends along a forward edge portion of the housing, and which, with the cassette housing located in the operation location, is located to be engaged by said guide means and moved from said housing into a cleaning position to be in cleaning engagement with at least said head surface;

said cartridge adapted to be mounted in said cassette housing comprising:
- a. a capstan cleaning portion mounted to said base frame, said capstan cleaning portion comprising a capstan cleaning member positioned to come into engagement with said capstan when said housing is in said operating position;
- c. a pinch roller cleaning portion which, with the cassette housing located in said operation location, is positioned to be in cleaning engagement with said pinch roller;
- d. said cartridge being arranged so that a portion of said ribbon is positioned to reach between said capstan cleaning portion and said pinch roller cleaning portion when said cassette housing is in said operating location;

whereby, with the cassette housing in said operating location, and upon operation of said player and/or recording apparatus, said pinch roller and capstan grip the ribbon to move the ribbon along the length of the ribbon, and the capstan cleaning portion and the pinch roller cleaning portion are in cleaning engagement with the capstan and pinch roller, respectively.

23. The cartridge as recited in claim 22, wherein there is a mounting arm mounted to said base frame provided with opening means positioned between an end cleaning portion and a mounting portion so that said ribbon extends through said opening means, said mounting arm being resiliently mounted and positioned to come into cleaning engagement with said pinch roller.

* * * * *